(No Model.)
P. KOCH.
BELT FASTENER.
No. 317,549. Patented May 12, 1885.
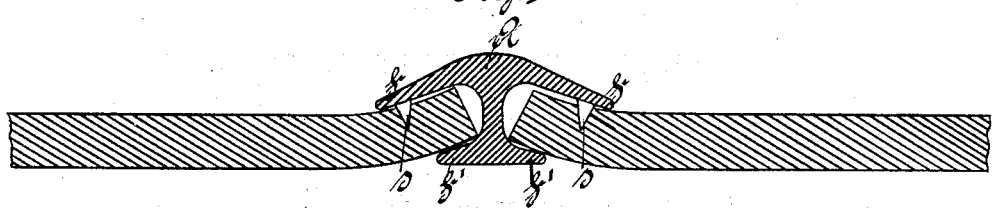
Fig. I.
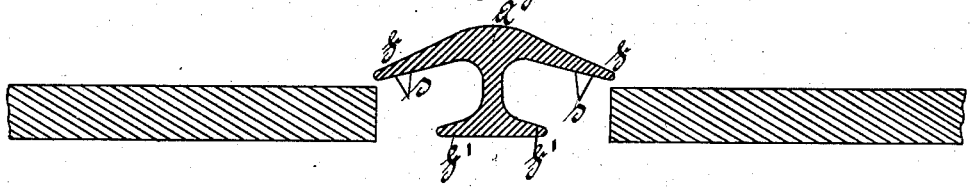
Fig. II.
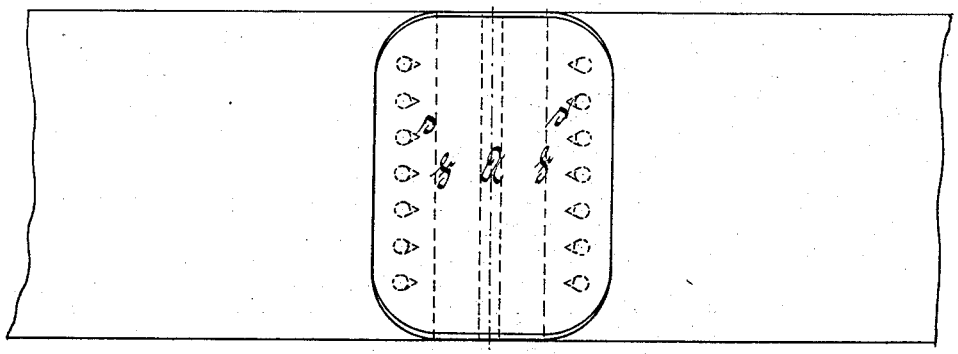
Fig. III.
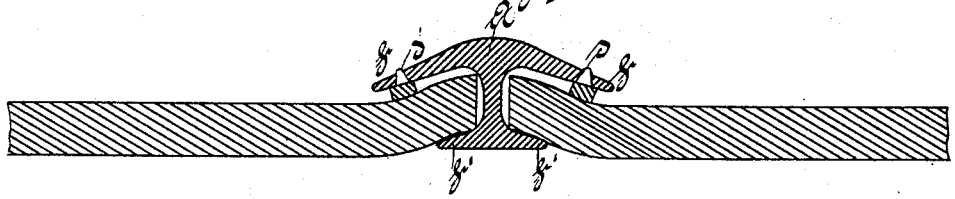
Fig. IV.
Witnesses.
J. Wetter
A. E. Melhuish
Inventor:
P. Koch
by H. Haddan
atty

UNITED STATES PATENT OFFICE.

PHILIPPE KOCH, OF NEUSS, GERMANY.

BELT-FASTENER.

SPECIFICATION forming part of Letters Patent No. 317,549, dated May 12, 1885.

Application filed October 29, 1884. (No model.) Patented in Belgium September 6, 1884, No. 66,242.

*To all whom it may concern:*

Be it known that I, PHILIPPE KOCH, of Neuss, in the German Empire, have invented a new and useful Improvement in Belt-Fasteners, (for which I have obtained patent in Belgium, No. 66,242, dated September 6, 1884,) of which the following is a specification.

The present construction of a belt-fastener is designed for belts serving for the transmission of small power. It differs from present constructions by the exceedingly simple mode of fastening the ends of the belt to the connecting-piece, and by the simplicity of its production.

The invention consists of the double-T-shaped connecting-piece A, with flanges $f\ f$ and $f'\ f'$ of different breadths, for the purpose of holding the ends of the belt at the broad flanges $f\ f$ by means of the prongs $s$, and of preventing the ends from shifting by placing the same on the narrower flanges $f'\ f'$.

In the accompanying drawings, Figures I to IV represent a belt-fastener embodying this invention.

The double-T-shaped piece A has an upper long flange $f$, provided at its end with prongs $s$ and a lower shorter flange $f'$. The long flange $f$ with the prongs $s$ serves to hold the belt, the prongs being pressed into the belt by any suitable tool, such as pinchers or a hammer. The short flange $f'$ serves as a support to the outer end of the belt, so as to prevent the same from detaching itself and shifting vertically to the joint. It will be seen that the same effect is obtained if the prongs are attached to the belt and pass into apertures in the connecting-piece A, Fig. IV. In this case the prongs are arranged on a metal plate, which is connected with the belt by pegs or screws. The ends of the belt are connected by placing the same on the short flange $f'$ and by pressing the prongs mounted on the belt into the flange $f$ by means of pinchers or any other suitable tool. The prongs $s$ receive the pulling-strain, and the short flange $f'$ prevents the belt being detached from the connecting-piece.

I claim—

1. The combination of a belt with a double-T-shaped connecting-piece having flanges of different breadths, the ends of the belt being introduced between the flanges on each side of the web and secured to the broader flanges by means of spurs or pins, substantially in the manner and for the purpose set forth.

2. A belt-fastener consisting of the double-T-shaped connecting-piece A, having flanges $f$ and $f'$ of different breadths, the flanges $f$ being provided with spurs or pins $s\ s$, and adapted to be applied to the ends of a belt, substantially in the manner and for the purpose set forth.

In testimony whereof I have signed this specification in the presence of two subscribing witnesses.

PHILIPPE KOCH.

Witnesses:
 FRIEDR. HAMECHER,
 HEINR. KRATZ.